US008229249B2

(12) United States Patent
Seki (10) Patent No.: US 8,229,249 B2
(45) Date of Patent: Jul. 24, 2012

(54) SPATIAL MOTION CALCULATION APPARATUS AND METHOD FOR THE SAME

(75) Inventor: Akihito Seki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 948 days.

(21) Appl. No.: 12/212,765

(22) Filed: Sep. 18, 2008

(65) Prior Publication Data
US 2009/0226034 A1 Sep. 10, 2009

(30) Foreign Application Priority Data

Mar. 10, 2008 (JP) .................. 2008-059840

(51) Int. Cl.
*G06K 9/36* (2006.01)
*G06K 9/62* (2006.01)
*G06K 9/46* (2006.01)
*G06K 9/00* (2006.01)

(52) U.S. Cl. ........ 382/291; 382/103; 382/106; 382/154; 382/165; 382/190; 382/203; 382/224; 382/225; 382/288

(58) Field of Classification Search .................. None
See application file for complete search history.

(56) References Cited

U.S. PATENT DOCUMENTS

| 2004/0240725 A1* | 12/2004 | Xu et al. ................ 382/154 |
| 2008/0181453 A1* | 7/2008 | Xu et al. ................ 382/103 |
| 2010/0034426 A1* | 2/2010 | Takiguchi et al. ............ 382/106 |

FOREIGN PATENT DOCUMENTS

JP 10-027249 1/1998

OTHER PUBLICATIONS

Yang et al., "Efficient mean-shift tracking via a new similarity measure", Proc. CVPR'05, pp. 1-8.*
Tyagi et al., "Fusion of multiple camera views for kernel-based 3D tracking", IEEE WMVC'07, pp. 1-8.*
Tyagi, et al., Fusion of Multiple Camera Views for Kernel-Based 3D Tracking, Proc. IEEE Workshop on Motion and Video Computing, 2007.
Yang, et al., Efficient Mean-Shift Tracking via a New Similarity Measure, Proc. IEEE CVPR, vol. 1, pp. 176-183, 2005.

* cited by examiner

*Primary Examiner* — Tom Y Lu
*Assistant Examiner* — Thomas Conway
(74) *Attorney, Agent, or Firm* — Turocy & Watson, LLP (57) ABSTRACT

A spatial motion calculation apparatus includes an image position relation calculation unit that calculates first similarities based on an image position relation between an inputted groups of feature points 1 and 2, a spatial position relation calculation unit that calculates second similarities based on an spatial position relation between said inputted groups, a feature descriptor relation calculation unit that calculates third similarities based on a feature descriptor relation between said inputted groups, and a spatial motion calculation unit that estimates the spatial motion based on the result that integrates the first to third similarities.

9 Claims, 8 Drawing Sheets

BEFORE MOVEMENT

FIG. 4B

AFTER MOVEMENT

SPATIAL MOTION CALCULATION APPARATUS AND METHOD FOR THE SAME

CROSS-REFERENCE TO RELATED APPLICATION

This application is based upon and claims the benefit of priority from the prior Japanese Patent Application No. 2008-59840, filed on Mar. 10, 2008; the entire contents of which are incorporated herein by reference.

FIELD OF INVENTION

The present invention relates to a spatial motion calculation apparatus and a method for the same in which a TV camera or any other similar device images an object moving through space to estimate the three-dimensional movement of the object.

DESCRIPTION OF THE BACKGROUND

When stereo cameras or any other similar device is used to track an object moving through space, the tracking has not been carried out by considering the total relationship among image positions, spatial positions, and feature descriptor (e.g., brightness) of feature points on the moving object (see, for example, JP-A-10-27249(Kokai), and Tyagi et al., "Fusion of Multiple Camera Views for Kernel-Based 3D Tracking," IEEE Workshop on Motion on Video Computing, 2007). The "image position" used herein means a position in an image coordinate system. The "spatial position" used herein means a position or disparity in a spatial coordinate system. The "disparity" used herein means the amount of discrepancy between the image positions of two points obtained by projecting a single point in space onto two images.

Since the spatial motion and the amount of change in image cannot be determined independently, the tracking has not been carried out by considering both the parameters. The "amount of change in image" means the shift in position and the change in size of a moving object observed on an image when the moving object moves through space.

Since image positions and feature descriptor are directly observed on an image, observed values contain relatively small amounts of noise. However, spatial positions are estimated, for example, based on the principle of triangulation using a plurality of TV cameras or other similar devices, so that the estimated spatial positions may contain large amounts of noise. In this case, it is difficult to calculate the spatial motion in a stable manner by using methods of related art.

As described above, no technology of related art unfortunately estimates the spatial motion of a moving object by totally considering image positions, spatial positions, and feature descriptor of feature points on the moving object. Further, when spatial positions contain noise, it is disadvantageously difficult to estimate the spatial motion in a stable manner.

The invention has been made to solve the above problems of related art, and an object of the invention is to provide a spatial motion calculation apparatus and a method for the same in which image positions, spatial positions, and feature descriptor of feature points on an object moving through space are totally considered.

SUMMARY OF THE INVENTION

According to an embodiment of the invention, the present embodiment provides a spatial motion calculation apparatus including a first input unit configured to input image positions, spatial positions, and feature descriptors of a plurality of first feature points within a tracked area of an object of interest before the object moves; a second input unit configured to input image positions, spatial positions, and feature descriptors of a plurality of second feature points within an area of containing the object of interest after the object has moved; an image position relation calculation unit configured to determine each of first similarity functions based on the image position of each of the plurality of first feature points and the image position of each of the plurality of second feature points, each of the first similarity functions (1) containing the shift on the image and a parameter representing the depth direction on the image as unknowns and (2) having a larger value when the distance between the image position of each of the plurality of first feature points and the image position of each of the plurality of second feature points is closer; a spatial position relation calculation unit configured to determine each of second similarity functions based on the spatial position of each of the plurality of first feature points and the spatial position of each of the plurality of second feature points, each of the second similarity functions (1) containing the shift on the image and the parameter representing the depth direction on the image as unknowns and (2) having a larger value when the distance between the spatial position of each of the plurality of first feature points and the spatial position of each of the plurality of second feature points is closer; a feature descriptor relation calculation unit configured to determine each of third similarity functions based on the feature descriptor of each of the plurality of first feature points and the feature descriptor of each of the plurality of second feature points, each of the third similarity functions having a larger value when the feature descriptor of each of the plurality of first feature points and the feature descriptor of each of the plurality of second feature points are more similar; an integration unit configured to determine the shift on the image and the parameter representing the depth direction on the image that maximize an integrated similarity determined by the sum of the products of the first similarity functions, the second similarity functions, and the third similarity functions; and a spatial motion calculation unit configured to calculate the spatial motion of the object of interest between the positions of the object of interest before and after the movement based on the shift on the image and the parameter representing the depth direction on the image.

DETAILED DESCRIPTION OF THE INVENTION

Spatial motion calculation apparatus according to embodiments of the invention will be described below with reference to the drawings.

First Embodiment

A spatial motion calculation apparatus according to a first embodiment of the invention will be described with reference to FIGS. 1 to 5A and 5B.

The spatial motion calculation apparatus calculates the spatial motion of the center of gravity of an object (a human being, a vehicle, and other objects) 101 moving through space between the positions of the object before and after the movement.

Figure 1:
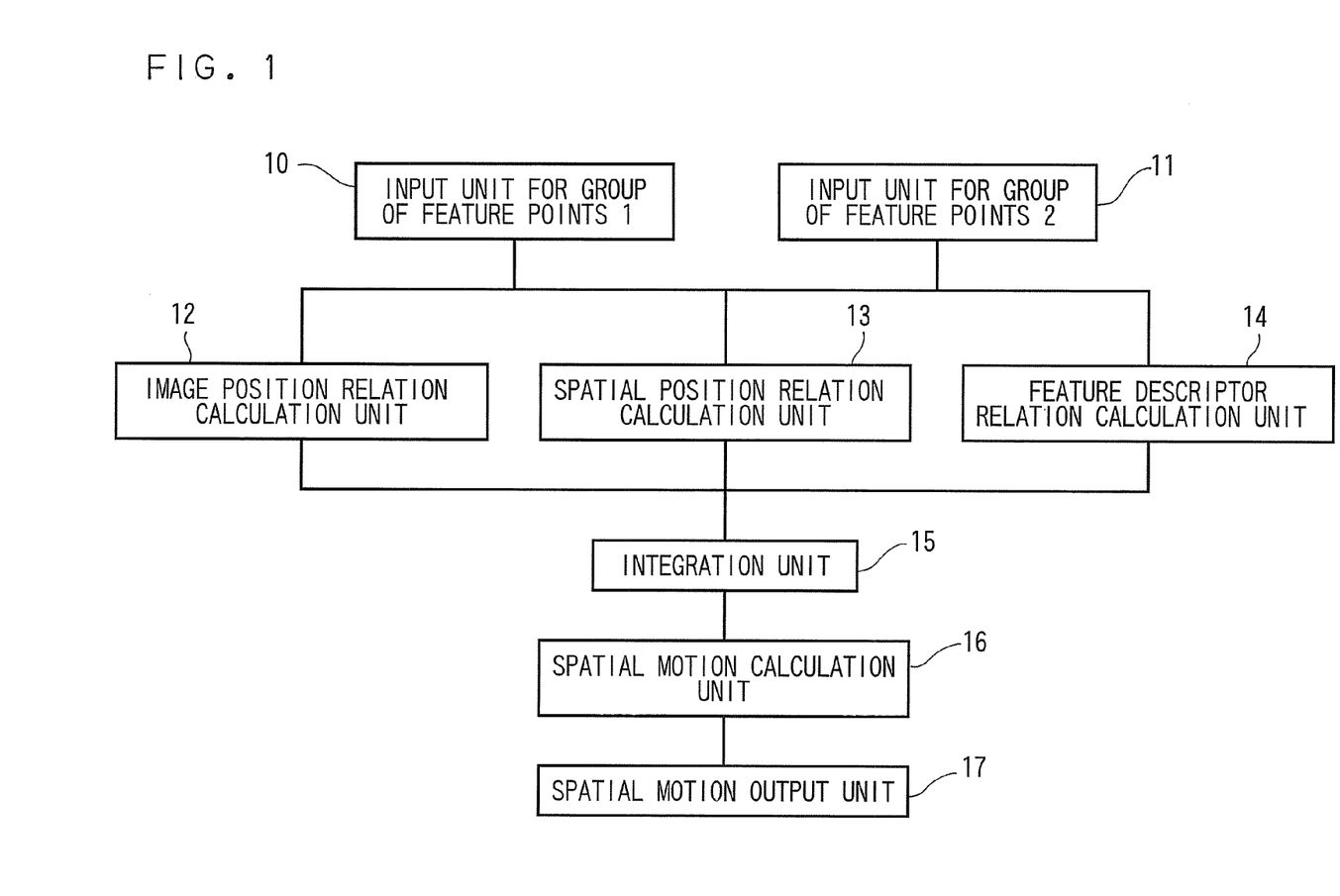
FIG. 1 is a block diagram showing a spatial motion calculation apparatus according to a first embodiment of the invention.

FIG. 1 is a block diagram showing the spatial motion calculation apparatus.

The spatial motion calculation apparatus includes an input unit 10 that inputs image positions, spatial positions, and feature descriptor of a plurality of feature points (hereinafter referred to as "a group of feature points 1") in a tracked area before the object 101 moves, an input unit 11 that inputs image positions, spatial positions, and feature descriptor of a plurality of feature points (hereinafter referred to as "a group of feature points 2") in an area containing the tracked subject after the object 101 has moved, an image position relation calculation unit 12 that calculates first similarities based on the image position relation between the inputted groups of feature points 1 and 2, a spatial position relation calculation unit 13 that calculates second similarities based on the spatial position relation between the inputted groups of feature points 1 and 2, a feature descriptor relation calculation unit 14 that calculates third similarities based on the feature descriptor relation between the inputted groups of feature points 1 and 2, an integration unit 15 that integrates the first to third similarities, a spatial motion calculation unit 16 that estimates the spatial motion based on the result from the integration unit 15, and an output unit 17 that outputs the spatial motion.

The functions of the units 10 to 17 can also be implemented by a program stored on a computer-readable medium in a computer.

Figure 2:
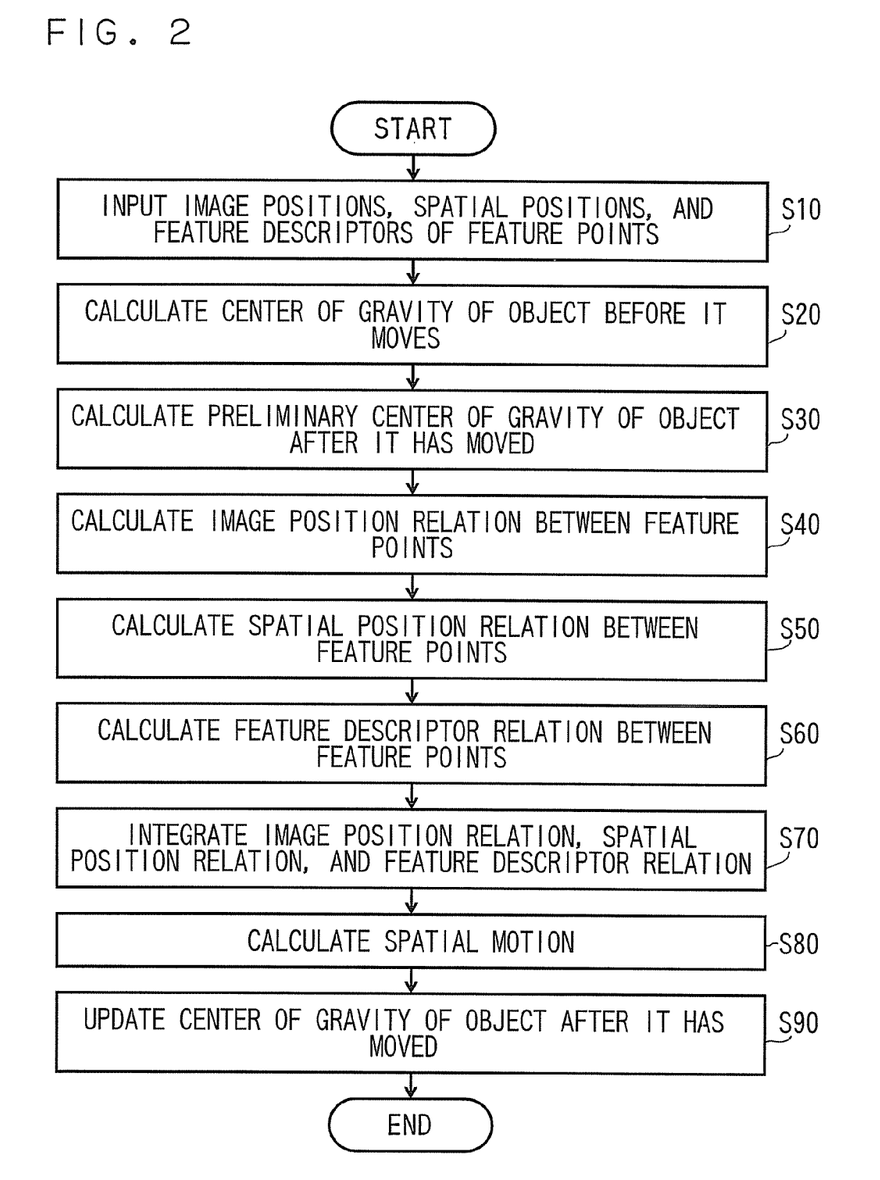
FIG. 2 is a flowchart showing the operation of the spatial motion calculation apparatus according to the first embodiment.

The operation of the spatial motion calculation apparatus will be described with reference to FIGS. 1 to 3. FIG. 2 is a flowchart showing the operation of the spatial motion calculation apparatus.

Coordinate systems used in the present embodiment will be described below.

Figure 3:
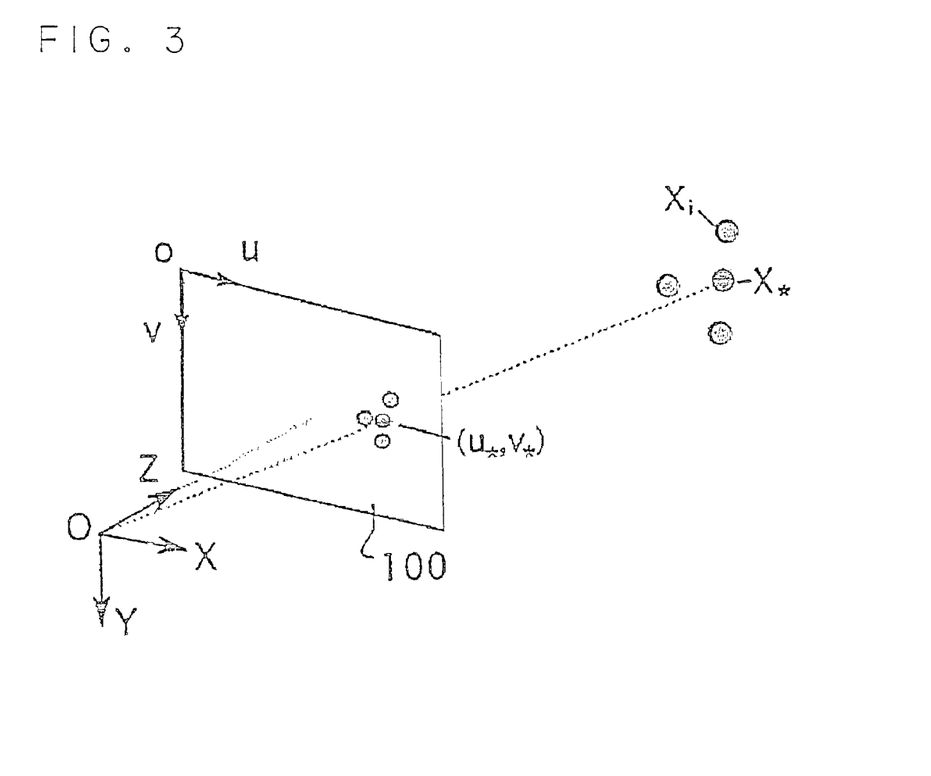
FIG. 3 is a descriptive view of a spatial coordinate system and an image coordinate system.

As shown in FIG. 3, a spatial coordinate system O-XYZ and an image coordinate system o-uv are set with respect to an image plane 100. Vector quantities are expressed in bold type in the specification, drawings, and equations. Scalar quantities are expressed as "A", for example, in the drawings, equations, and specification.

Feature descriptor in the present embodiment will be described below.

The "feature descriptor" may be anything as far as it represents a feature, such as a color value, brightness, histogram, and curvature in the position of a feature point. The group of feature points 1 and the group of feature points 2 do not necessarily contain the same feature points on the object 101. The feature points in the group of feature points 1 do not necessarily correspond to the feature points in the group of feature points 2.

Figure 4A:
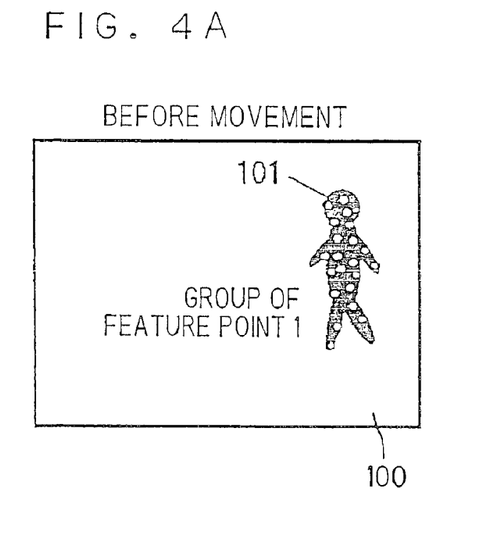
FIGS. 4A and 4B are descriptive views of a group of feature points 1 and a group of feature points 2.

Information on the group of feature points 1 is inputted to the input unit 10. The information includes positions x=(u, v) in the image coordinate system, positions X=(X, Y, Z) in the spatial coordinate system, and feature descriptor f. As shown in FIG. 4A, the group of feature points 1 is selected from those on the object 101 before it moves.

Figure 4B:
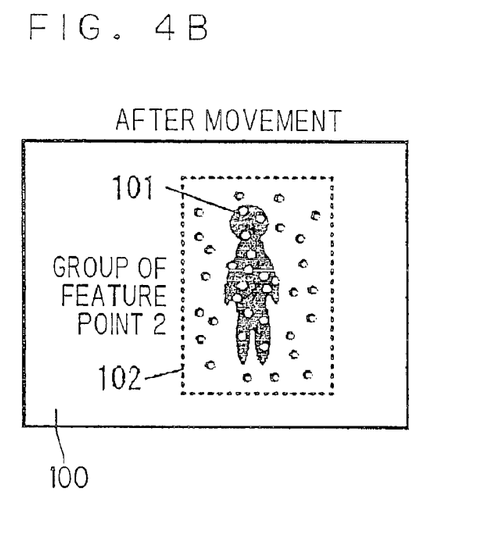

Information on the group of feature points 2 is inputted to the input unit 11. The information to be inputted includes positions x'=(u', v') in the image coordinate system, positions X'=(X', Y', Z') in the spatial coordinate system, and feature descriptor f'. As shown in FIG. 4B, the group of feature points 2 is selected from those in an area 102 that contains the object 101 after it has moved.

Positions in the image coordinate system are determined from the pixel positions of feature points in an image captured by a camera.

Positions in the spatial coordinate system are related to positions in the image coordinate system by applying a laser beam to the actual object 101 in space to perform laser photometry. Positions in the spatial coordinate system may alternatively be determined by imaging the object 101 with stereo cameras and using the principle of triangulation.

The input unit 10 calculates the center of gravity of the moving object 101 in the spatial coordinate system and that in the image coordinate system based on the group of feature points 1.

The center of gravity $X^* = (X^*, Y^*, Z^*)$ in the spatial coordinate system is given by the equation (20-1).

$$X_* = \frac{1}{N} \sum_{i=1}^{N} X_i \tag{20-1}$$

In the equation, $X_i$ represents the spatial position of the i-th feature point among the group of feature points 1, which has a total of N points.

Subsequently, the equation (20-2) is used to determine the position $x^* = (u^*, v^*)$, which is obtained by projecting $X^*$ onto an image.

$$u_* = u_0 + \frac{X_*}{Z_*} f, \quad v_* = v_0 + \frac{Y_*}{Z_*} f \tag{20-2}$$

The equation (20-2) represents a camera model by which a spatial position is projected onto the image plane 100. In the equation, f is obtained by dividing the focal length of the camera by an effective pixel interval, and $(u_0, c_0)$ is the position where the optical axis intersects the image plane 100.

The input unit 11 calculates a preliminary center of gravity Y of the object after it has moved in the spatial coordinate system and a preliminary center of gravity y in the image coordinate system based on the group of feature points 2. The word "preliminary" is used because a true center of gravity has not been determined. The preliminary center of gravity y is a position shifted from the center of gravity x* of the group of feature points 1 on the image by $p = (p_1, p_2)$. That is, $$y = x^* + p$$

The preliminary center of gravity Y is determined by p (positional shift on the image) and s (change in scale on the image), as indicated by the equation (30-1).

$$Y = \left( \frac{Z_*}{sf}\left(\frac{X_*}{Z_*}f + p_1\right), \frac{Z_*}{sf}\left(\frac{Y_*}{Z_*}f + p_2\right), \frac{Z_*}{s} \right) \tag{30-1}$$

When there is some prior knowledge about the preliminary center of gravity y, a value based on the knowledge may be inputted as the preliminary center of gravity. When there is no such knowledge, the preliminary center of gravity y may be the center of gravity of the group of feature points 1 (that is, p=(0, 0), s=1) or the center of gravity of the group of feature points 2.

The image position relation calculation unit 12 defines in accordance with the equation (40-1) a first similarity function $w_{ij}$ representing the positional relationship in the image coordinate system between a feature point i that belongs to the group of feature points 1 and a feature point j that belongs to the group of feature points 2.

$$w_{ij} = w\left(\left|\frac{\sqrt{2}\Delta x_i}{\sigma} - \frac{\Delta x'_j}{\sqrt{s}\,\sigma}\right|^2\right) \quad (40\text{-}1)$$

In the equation, the function w represents an RBF (Radial Basis Function) kernel; s represents the change in scale on the image 100; and $\sigma$ represents a predetermined bandwidth. $\Delta x_i = x_i - x^*$ is a vector starting from the center of gravity $x^*$, and $\Delta x'_j = x'_j - y$ is a vector starting from the preliminary center of gravity y.

In the equation, $\Delta x'_j$ including s and $p=(p_1, p_2)$ is an unknown.

In the present embodiment, the shape shown in the equation (40-2) is used as the shape of the function w.

$$w(|x|)=\exp(-x^2) \quad (40\text{-}2)$$

As apparent from the equation (40-2), the larger x is, the smaller the value of the function w is. In the equation (40-1), when a vector having a distance from the center of gravity of one of the groups of feature points and a vector having a distance from the center of gravity of the other group of feature points and multiplied by s have the same direction and the same length, the first similarity function $w_{ij}$ has a large value. The description of the equations (40-1) and (40-2) will be collectively made in the step 70, which will be described later.

The spatial position relation calculation unit 13 defines in accordance with the equation (50-1) a second similarity function $m_{ij}$ representing the positional relationship in the spatial coordinate system between the feature point i that belongs to the group of feature points 1 and the feature point j that belongs to the group of feature points 2.

$$m_{ij} = m\left(\left|\frac{X_i - X'_j + \Delta X}{n}\right|^2\right) \quad (50\text{-}1)$$

In the equation (50-1), the function m is an RBF kernel as with the function w in the step 40; n is a predetermined bandwidth; $X_i$ is the position of the feature point i in the spatial coordinate system; $X'_j$ is the position of the feature point j in the spatial coordinate system; and $\Delta X$ is the spatial motion between the positions of the object 101 before and after the movement.

In the equation, $\Delta X$ including s and $p=(p_1, p_2)$ is an unknown.

The camera model can be used to determine the relationship between the image plane 100 and the spatial coordinate system. The spatial motion $\Delta X$ is expressed by using $p=(p_1, p_2)$ and s in the step 40 as follows:

$$\Delta X = \begin{pmatrix} \frac{Z_*}{sf}\left(\frac{X_*}{Z_*}f + p_1\right) - X_* \\ \frac{Z_*}{sf}\left(\frac{Y_*}{Z_*}f + p_2\right) - Y_* \\ \left(\frac{1}{s} - 1\right)Z_* \end{pmatrix} \quad (50\text{-}2)$$

The feature descriptor relation calculation unit 14 defines in accordance with the equation (60-1) the third similarity $k_{ij}$ between the feature descriptor of the feature point i that belongs to the group of feature points 1 and the feature descriptor of the feature point j that belongs to the group of feature points 2.

$$k_{ij} = k\left(\left|\frac{f_i - f'_j}{h}\right|^2\right) \quad (60\text{-}1)$$

In the equation (60-1), the vector $f_i$ represents the feature descriptor of the feature point i, and the vector $f'_j$ represents the feature descriptor of the feature point j. The function k is an RBF kernel as with the function w in the step 40, and h is a predetermined bandwidth.

The integration unit 15 integrates the three kinds of similarity functions $w_{ij}$, $m_{ij}$, and $k_{ij}$ calculated in the image position relation calculation unit 12, the spatial position relation calculation unit 13, and the feature descriptor relation calculation unit 14, respectively.

First, an integrated similarity $J_{ij}$ between the feature points i and j is determined by calculating the product of the three kinds of similarity functions $w_{ij}$, $m_{ij}$, and $k_{ij}$ obtained in the steps 40 to 60 (equation (70-1)).

$$J_{ij} = w_{ij} k_{ij} m_{ij} \quad (70\text{-}1)$$

The integrated similarity $J_{ij}$ is determined for all combinations of the points within the group of feature points 1 and the points within the group of feature points 2 by changing i and j, and the integrated similarity J between the group of feature points 1 and the group of feature points 2 is determined by calculating the sum of the integrated similarities $J_{ij}$ in accordance with the equation (70-2).

$$J(p, s) = \frac{1}{MN}\sum_{i}^{N}\sum_{j}^{M} w_{ij} k_{ij} m_{ij} \quad (70\text{-}2)$$

The meaning of the integrated similarity J will be described below.

For the sake of simplicity, the integrated similarity J is first assumed to be only formed of the function w, and s is assumed to be one.

Figure 5A:
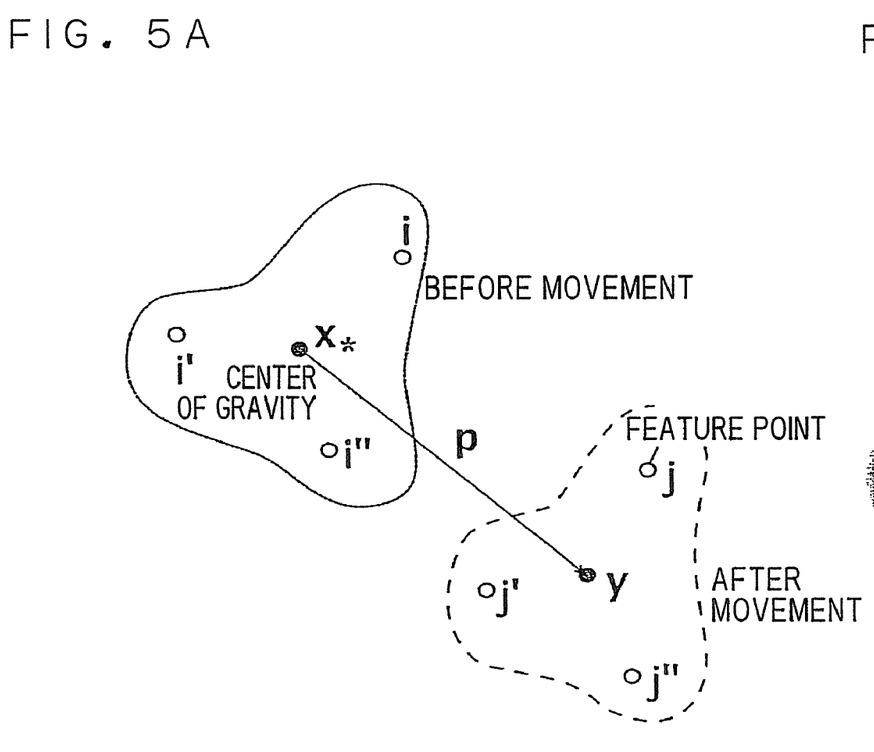
FIGS. 5A and 5B are descriptive views of a similarity in a limited case where only the shift on the image p is considered.
Figure 5B:
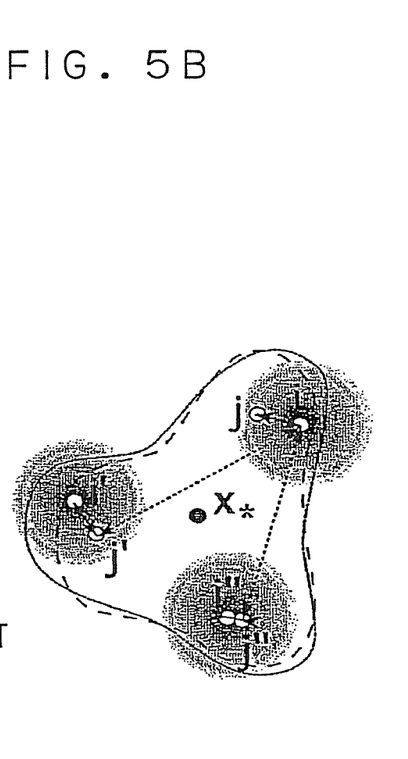

As shown in FIG. 5A, let i, i', and i" be points on the object before it moves; j, j', and j" be points on the object after it has moved; $x^*$ be the center of gravity of the object before it moves; and y be the preliminary center of gravity of the object after it has moved (the preliminary center of gravity can be expressed by $y=x^*+p$, where p represents the shift). In the equation, the shift p is the variable to be determined. Referring to the term in the parentheses in the function w expressed by the equation (40-1), the term is, for example, the difference between the vector $(x_i - x^*)$ starting from the center of gravity $x^*$ of the point i and the vector $(x'_j - y)$ starting from the preliminary center of gravity y of the point j. FIG. 5B illustrates such a difference. Since the function w has a large value when the norm of the resultant vector is small, it can be intuitively said that the density becomes lower at a radial point farther away from its center, that is, any of the points i, i', and i" shown in FIG. 5B. Referring to the symbol $\Sigma$ in the equation of the integrated similarity J, the symbol represents the sum of the function w for all combinations of the points i, i', and i" and the points j, j', and j". When the preliminary center of gravity y is far away from the true center of gravity after the movement, $(x_i-x^*)$ is apart from $(x_j'-y)$ and hence the function w has a small value in many cases. The integrated similarity J as a whole has therefore a small value. Therefore, the center of gravity y that maximizes the value of the integrated similarity J, that is, the true center of gravity, is determined by estimating the shift p.

The integrated similarity J expressed by the equation (70-2) is not only formed of the function w but also the functions k and m multiplied to the function k. The function k has a large value when two points are close to each other in terms of a certain feature descriptor (the function k has a large value, for example, when two points have similar colors), while having a small value when the two points are apart from each other in terms of the feature descriptor. On the other hand, the function m evaluates spatial positional closeness. The integrated similarity J can therefore be considered as a similarity obtained by considering the image positions, features descriptor, and spatial positions of points for a given center of gravity.

The spatial motion calculation unit 16 calculates the spatial motion $\Delta X$. Several methods for calculating this amount will be described below.

A first calculation method will be described.

According to the equation (50-2), the amount of spatial motion $\Delta X$ is determined by $p=(p_1, p_2)$ and s. Therefore, the equation (70-2) used for the integration in the step 70 performed in the integrator 15 is used to search $p=(p_1, p_2)$ and s that maximize the integrated similarity J by setting a plurality of values of $p=(p_2, p_2)$ and s at respective certain intervals in accordance with $$\underset{p,s}{\operatorname{argmax}} J(p, s) \tag{80-1}$$

determining three kinds of similarity functions $w_{ij}$, $m_{ij}$, and $k_{ij}$ for all the values of $p=(p_1, p_2)$ and s, and calculating the integrated similarity J.

A second calculation method will be described. This calculation method searches for $p=(p_1, p_2)$ and s more efficiently than in the first calculation method.

First, assume the integrated similarity J is a function expressed by the equation (80-2) and redefine it a function L.

$$L(p,s) = -\log J(p,s) \tag{80-2}$$

Since the function L has the minimum value when the function J has the maximum value, the minimum value of the function L is estimated by determining an extreme value of the function L.

First, a method for determining $p_1$ of $p=(p_1, p_2)$ will be described.

To first determine an extreme value of the function L, the function L that undergoes partial differentiation ($\nabla$) with $p_1$ should be zero. Therefore, the following equation $$\nabla L(p, s) = -\frac{\nabla J(p, s)}{J(p, s)} \tag{80-3}$$

should be zero.

To this end, $\nabla J$ in the equation (80-3) is derived as follows:

$$\nabla J(p, s) = \frac{\partial J(p, s)}{\partial p_1} \tag{80-4}$$

$$= \frac{1}{MN} \sum_i^N \sum_j^M \left\{ \frac{\partial w_{ij}}{\partial p_1} k_{ij} m_{ij} + w_{ij} k_{ij} \frac{\partial m_{ij}}{\partial p_1} \right\}$$

$$\frac{\partial w_{ij}}{\partial p_1} = -\frac{2}{\sigma^2}\left(\Delta x_i - \frac{\Delta x_j'}{s}\right) w_{ij}$$

$$\frac{\partial m_{ij}}{\partial p_1} = -\frac{2Z_*}{n^2 sf}\left[X_i - X_j' + \frac{Z_*}{sf}\left(\frac{X_*}{Z_*}f + p_1\right) - X_*\right] m_{ij}$$

The equation (80-4) is substituted into the equation (80-3), and the resultant equation is organized under the condition of $\nabla L=0$ to provide the following equation:

$$p_1 = \frac{\left(1 - \frac{1}{s}\right)\left(\frac{1}{\sigma^2} u_* + \frac{Z_* X_*}{n^2 sf}\right) + q'}{\frac{1}{s\sigma^2} + \frac{Z_*^2}{n^2 s^2 f^2}} \tag{80-5}$$

$$q' = \frac{\sum_i^N \sum_j^M \left\{ \begin{array}{c} -\frac{1}{\sigma^2}\left(u_i - \frac{u_j'}{s}\right) - \\ \frac{Z_*}{n^2 sf}(X_i - X_j') \end{array} \right\} w_{ij} k_{ij} m_{ij}}{\sum_i^N \sum_j^M w_{ij} k_{ij} m_{ij}}$$

The value $p_1$ is determined from the equation (80-5), and then $p_1$ that minimizes the function L expressed by the equation (80-2) can be determined.

Similarly, $p_2$ of $p=(p_1, p_2)$ is derived as follows:

$$p_2 = \frac{\left(1 - \frac{1}{s}\right)\left(\frac{1}{\sigma^2} v_* + \frac{Z_* Y_*}{n^2 sf}\right) + q''}{\frac{1}{s\sigma^2} + \frac{Z_*^2}{n^2 s^2 f^2}} \tag{80-6}$$

$$q'' = \frac{\sum_i^N \sum_j^M \left\{ \begin{array}{c} -\frac{1}{\sigma^2}\left(v_i - \frac{v_j'}{s}\right) - \\ \frac{Z_*}{n^2 sf}(Y_i - Y_j') \end{array} \right\} w_{ij} k_{ij} m_{ij}}{\sum_i^N \sum_j^M w_{ij} k_{ij} m_{ij}}$$

Subsequently, s is derived in a similar procedure as follows:

$$\alpha s^3 + \beta s + \gamma = 0 \tag{80-7}$$

$$\alpha = \sum_i^N \sum_j^M \left(-\frac{\Delta x_j^2}{\sigma^2}\right) w_{ij} k_{ij} m_{ij}$$

$$\beta = \sum_i^N \sum_j^M \left(k_{ij}'' m' - \frac{\Delta x_j'^2}{\sigma^2}\right) w_{ij} k_{ij} m_{ij}$$

$$\gamma = \sum_i^N \sum_j^M k' m' w_{ij} k_{ij} m_{ij}$$

-continued $$k' = -\frac{2Z_*^2}{n^2}\left(\frac{X_*}{Z_*} + \frac{p_1}{f} \quad \frac{Y_*}{Z_*} + \frac{p_2}{f} \quad 1\right)$$

$$k''_{ij} = -\frac{2Z_*^2}{n^2}(X_i - X'_j - X_* \quad Y_i - Y^*_j - Y_* \quad Z_i - Z'_j - Z_*)$$

$$m' = \left(-\frac{1}{f}\left(\frac{X_*}{Z_*}f + p_1\right) \quad -\frac{1}{f}\left(\frac{Y_*}{Z_*}f + p_2\right) \quad -1\right)^T$$

The equation (80-7) is a cubic equation for s. Therefore, to determine s, Cardano's formula, for example, may be used to select a real number greater than zero as a solution for s, because there is always only one positive real number solution.

It is noted that values used to calculate the center of gravity of the object after it has moved are used as p and s in the right hand of each of the equations (80-5), (80-6), and (80-7).

The output unit 17 uses $p=(p_1, p_2)$ and s determined in the step 80 to update the preliminary center of gravity of the object 101 after it has moved.

Specifically, $p=(p_1, p_2)$ and s are updated to the values determined in the step 80 performed in the spatial motion calculation unit 16.

Alternatively, since the equation (50-2) expresses the relationship between $\Delta X$, which is the spatial motion, and $p=(p_1, p_2)$ and s, the equation (50-2) can be used to determine $\Delta X$ when $p=(p_1, p_2)$ and s are determined.

According to the present embodiment, the spatial motion can be calculated in a stable, quick manner by totally considering image positions, spatial positions, and feature descriptor of feature points on an object even when spatial positional components contain a large amount of noise.

Second Embodiment

Figure 6:
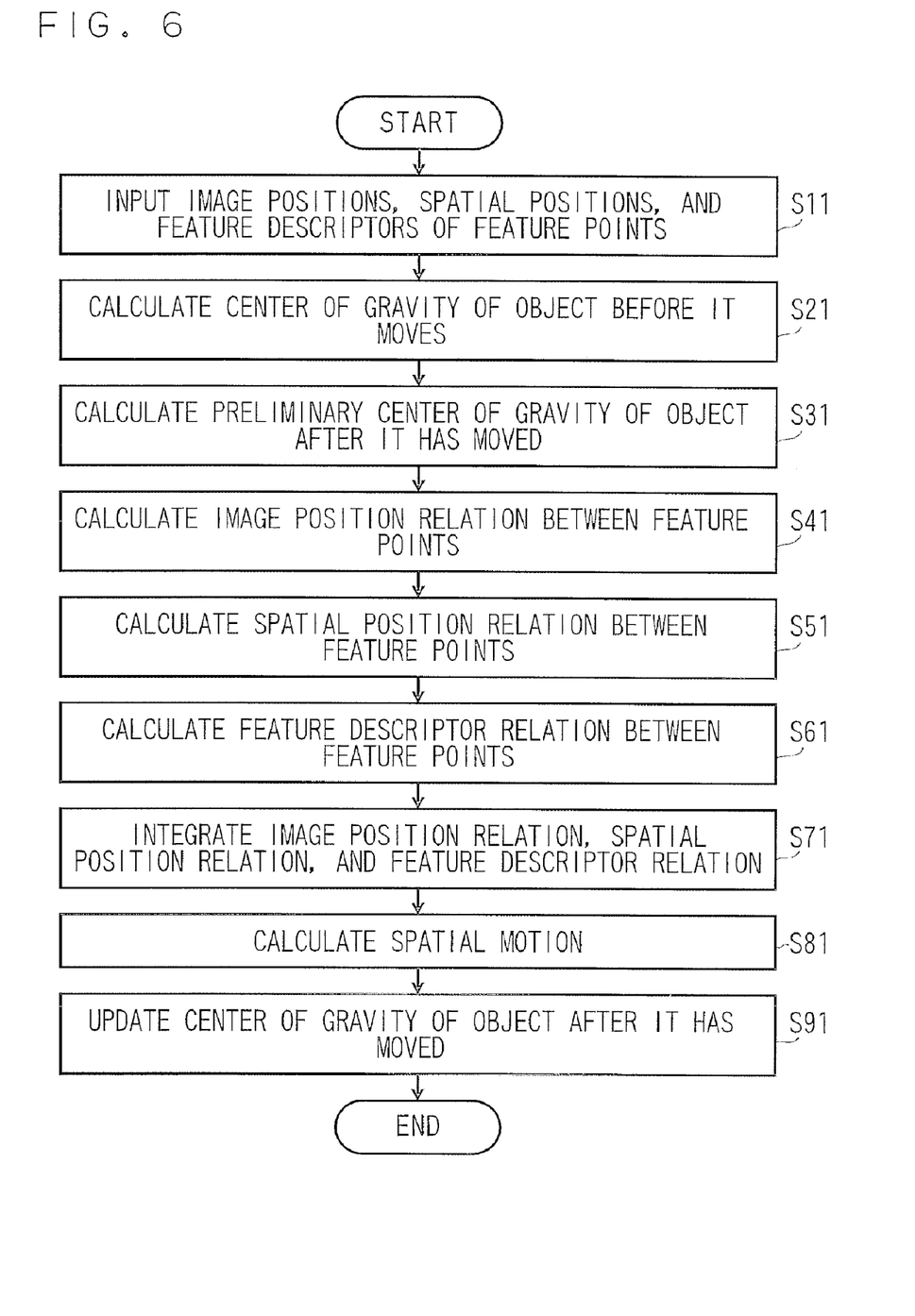
FIG. 6 is a flowchart showing the operation of a spatial motion calculation apparatus according to a second embodiment.

A spatial motion calculation apparatus of a second embodiment will be described with reference to FIGS. 6 and 7.

The configuration of the spatial motion calculation apparatus according to the present embodiment is the same as that in the first embodiment (see FIG. 1). The present embodiment, however, differs from the first embodiment in that a position X in the spatial coordinate system is not used but a disparity d is used to calculate the spatial motion.

Figure 7:
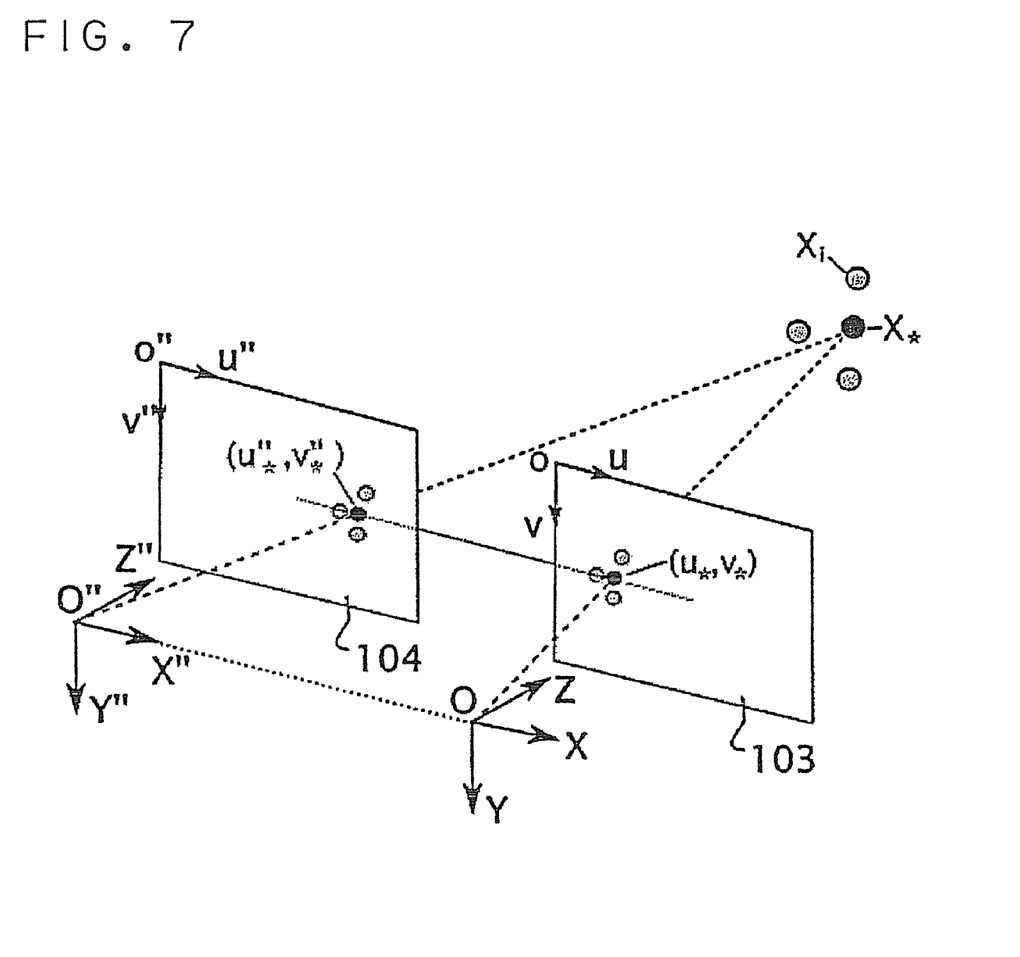
FIG. 7 is a descriptive view of a spatial coordinate system, an image coordinate system, and disparity.

The disparity d is the difference in the u-axis direction between a position projected onto a $1^{st}$ reference image 103 and a position projected onto a $2^{nd}$ reference image 104, as shown in FIG. 7. For example, the disparity for X* is u*-u"*. Let O-XYZ coordinate system be a $1^{st}$ reference coordinate system at the center of which a $1^{st}$ reference camera is located; O"-X"Y"Z" be a $2^{nd}$ reference coordinate system at the center of which a $2^{nd}$ reference camera is located; and b be the base length between O and O". When the X axis and the X" axis are on the same line; the Z axis is parallel to the Z" axis; and the $1^{st}$ reference image 103 and the $2^{nd}$ reference image 104 are in the same plane (a parallel stereo arrangement, in general), a position X in the spatial coordinate system can be determined by a disparity d and an image position $x=(u, v)$ as follows:

$$X = \frac{b(u-u_0)}{d}, Y = \frac{b(v-v_0)}{d}, Z = \frac{bf}{d} \quad (01\text{-}1)$$

A disparity d is thus used as a spatial position to calculate the spatial motion. In the following description, a position X in the spatial coordinate system used as a spatial position in the first embodiment is replaced with a disparity d. Each step will be described with reference to the flowchart of FIG. 7.

The step 11 is similar to the step 10 except that a disparity d is used as a spatial position instead of a position X in the spatial coordinate system.

That is, information on the group of feature points 1 is inputted to the input unit 10. The information includes positions $x=(u, v)$ in the image coordinate system, disparities d, and feature descriptors f.

Information on the group of feature points 2 is inputted to the input unit 11. The information includes positions $x'=(u', v')$ in the image coordinate system, disparities d', and feature descriptors f'.

The input unit 10 calculates the center of gravity of the disparities for the object 101 and the center of gravity in the image coordinate system based on the group of feature points 1.

The center of gravity d* of the disparities is given by the equation (21-1). In the equation, $d_i$ represents the disparity for the i-th feature point among the group of feature points 1, which has a total of N points, and $d_j'$ represents the disparity for the j-th feature point among the group of feature points 2, which has a total of M points.

$$d_* = \frac{1}{N}\sum_{i=1}^{N} d_i \quad (21\text{-}1)$$

Subsequently, the equation (21-2) and image positions $x_i$ of the group of feature points 1 are used to determine the center of gravity of image positions $x^*=(u^*, v^*)$ $$u_* = \frac{1}{N}\sum_{i}^{N} u_i, v_* = \frac{1}{N}\sum_{i}^{N} v_i \quad (21\text{-}2)$$

The input unit 11 calculates a preliminary center of gravity Y of the disparities for the object after it has moved and a preliminary center of gravity y in the image coordinate system based on the group of feature points 2.

The present step is similar to the step 30 except that the preliminary center of gravity Y (vector) in the spatial coordinate system of the object 101 in the step 30 is replaced with the center of gravity Y (scalar) of the disparities.

The center of gravity Y of the disparities is given by the following equation:

$$Y = sd^* \quad (31\text{-}1)$$

In the equation, s is the change in scale of the disparity for the object of interest before and after the movement on the image, and s is an unknown.

The present step is carried out in the same procedure as that in the step 40. That is, the image position relation calculation unit 12 defines the first similarity function $w_{ij}$ representing the positional relationship in the image coordinate system between a feature point i that belongs to the group of feature points 1 and a feature point j that belongs to the group of feature points 2.

The spatial position relation calculation unit 13 defines in accordance with the equation (51-1) the second similarity representing the relationship between the spatial position of the feature point i that belongs to the group of feature points 1 and the spatial position of the feature point j that belongs to the group of feature points 2.

$$m_{ij} = m\left(\left|\frac{d_i - d_j' + \Delta d}{n}\right|^2\right) \quad (51\text{-}1)$$

In the equation (51-1), the function m is an RBF kernel as with the function w in the step 40; n is a predetermined bandwidth; $d_i$ is the disparity of the feature point i; $d_j'$ is the disparity of the feature point j; and $\Delta d$ is the amount of change in disparity for the object 101 before and after the movement. The spatial motion $\Delta X$ can be determined by using a camera model, and can be expressed by using $p=(p_1, p_2)$ and s in the step 41 as follows:

$$\Delta X = \frac{b}{d_*} \begin{pmatrix} \frac{(u_* - u_0) + p_1}{s} - (u_* - u_0) \\ \frac{(v_* - v_0) + p_2}{s} - (v_* - v_0) \\ \left(\frac{1}{s} - 1\right)f \end{pmatrix} \quad (51\text{-}2)$$

The present step is carried out in the same procedure as that in the step 60. That is, the feature descriptor relation calculation unit 14 defines the third similarity $k_{ij}$ between the feature descriptor of the feature point i that belongs to the group of feature points 1 and the feature descriptor of the feature point j that belongs to the group of feature points 2.

The present step is carried out in the same procedure as that in the step 70. That is, the integration unit 15 integrates the three kinds of similarity functions $w_{ij}$, $m_{ij}$, and $k_{ij}$ calculated in the image position relation calculation unit 12, the spatial position relation calculation unit 13, and the feature descriptor relation calculation unit 14, respectively.

The spatial motion calculation unit 16 calculates the spatial motion $\Delta X$. The present step is substantially the same as the step 80 except that a spatial position X is not used but a disparity d is used as the spatial coordinates, and the spatial motion is calculated accordingly.

(8-1) First Calculation Method

A first calculation method will be described.

According to the equation (51-2), the spatial motion $\Delta X$ to be calculated is determined by $p=(p_1, p_2)$ and s. Therefore, the equation (70-2) used for the integration in the step 70 is used to search $p=(p_1, p_2)$ and s that maximize the integrated similarity J by setting a plurality of values of $p=(p_1, p_2)$ and s at respective certain intervals in accordance with $$\underset{p,s}{\mathrm{argmax}} J(p, s) \quad (81\text{-}1)$$

determining three kinds of similarity functions $w_{ij}$, $m_{ij}$, and $k_{ij}$ for all the values of $p=(p_1, p_2)$ and s, and calculating the integrated similarity J.

A second calculation method will be described. This calculation method searches for $p=(p_1, p_2)$ and s more efficiently than in the first calculation method.

First, assume the integrated similarity J is a function expressed by the equation (81-2) and redefine it as a function L.

$$L(p,s) = -\log J(p,s) \quad (81\text{-}2)$$

Since the function L has the minimum value when the function J has the maximum value, the minimum value of the function L is estimated by determining an extreme value of the function L.

First, a method for determining $p_1$ of $p=(p_1, p_2)$ will be described.

To first determine an extreme value of the function L, the function L that undergoes partial differentiation ($\nabla$) with $p_1$ should be zero. Therefore, the following equation $$\nabla L(p, s) = -\frac{\nabla J(p, s)}{J(p, s)} \quad (81\text{-}3)$$

should be zero.

To this end, $\nabla J$ in the equation (81-3) is derived as follows:

$$\nabla J(p, s) = \frac{\partial J(p, s)}{\partial p_1} \quad (81\text{-}4)$$

$$= \frac{1}{MN} \sum_i^N \sum_j^M \left\{ \frac{\partial w_{ij}}{\partial p_1} k_{ij} m_{ij} \right\}$$

$$\frac{\partial w_{ij}}{\partial p_1} = -\frac{2}{\sigma^2}\left(\Delta x_i - \frac{\Delta x'_j}{s}\right) w_{ij}$$

The equation (81-4) is substituted into the equation (81-3), and the resultant equation is organized under the condition of $\nabla L=0$ to provide the following equation:

$$p_1 = -s \left\{ \frac{\sum_i^N \sum_j^M \left(u_i - \frac{u'_j}{s}\right) w_{ij} k_{ij} m_{ij}}{\sum_i^N \sum_j^M w_{ij} k_{ij} m_{ij}} + \left(\frac{1}{s} - 1\right) u_* \right\} \quad (81\text{-}5)$$

The value $p_1$ is determined from the equation (81-5), and then $p_1$ that minimizes the function L expressed by the equation (81-2) can be determined.

Similarly, $p_2$ of $p=(p_1, p_2)$ is derived as follows:

$$p_2 = -s \left\{ \frac{\sum_i^N \sum_j^M \left(v_i - \frac{v'_j}{s}\right) w_{ij} k_{ij} m_{ij}}{\sum_i^N \sum_j^M w_{ij} k_{ij} m_{ij}} + \left(\frac{1}{s} - 1\right) v_* \right\} \quad (81\text{-}6)$$

Subsequently, s is derived in a similar procedure as follows:

$$\alpha s^3 + \beta s + \gamma = 0 \quad (81\text{-}7)$$

$$\alpha = \sum_i^N \sum_j^M \left(-\frac{2d_*^2}{n^2}\right) w_{ij} k_{ij} m_{ij}$$

$$\beta = \sum_i^N \sum_j^M \left(\frac{-2(d_i - d'_j - d_*)d_*}{n^2} - \frac{\Delta x_i^2}{\sigma^2}\right) w_{ij} k_{ij} m_{ij}$$

$$\gamma = \sum_i^N \sum_j^M \frac{\Delta x_i'^2}{\sigma^2} w_{ij} k_{ij} m_{ij}$$

The equation (81-7) is a cubic equation for s. Therefore, to determine s, Cardano's formula, for example, may be used to select a real number greater than zero as a solution for s, because there is always only one positive real number solution.

It is noted that values used to calculate the center of gravity of the object after it has moved are used as p and s in the right hand of each of the equations (81-5), (81-6), and (81-7).

The output unit 17 uses $p=(p_1, p_2)$ and s determined in the step 81 performed in the spatial motion calculation unit 16 to update the preliminary center of gravity of the object 101 after it has moved.

Specifically, p and s are updated to the values determined in the step 81.

Alternatively, since the equation (51-2) expresses the relationship between ΔX, which is the spatial motion, and p=($p_1$, $p_2$) and s, the equation (51-2) can be used to determine ΔX when p=($p_1$, $p_2$) and s are determined.

According to the present embodiment, the spatial motion can be calculated in a stable, quick manner by totally considering image positions, disparities, and feature descriptors of feature points on an object even when spatial positional components contain a large amount of noise.

Third Embodiment

A spatial motion calculation apparatus of a third embodiment will be described with reference to FIGS. 8 and 9.

Figure 8:
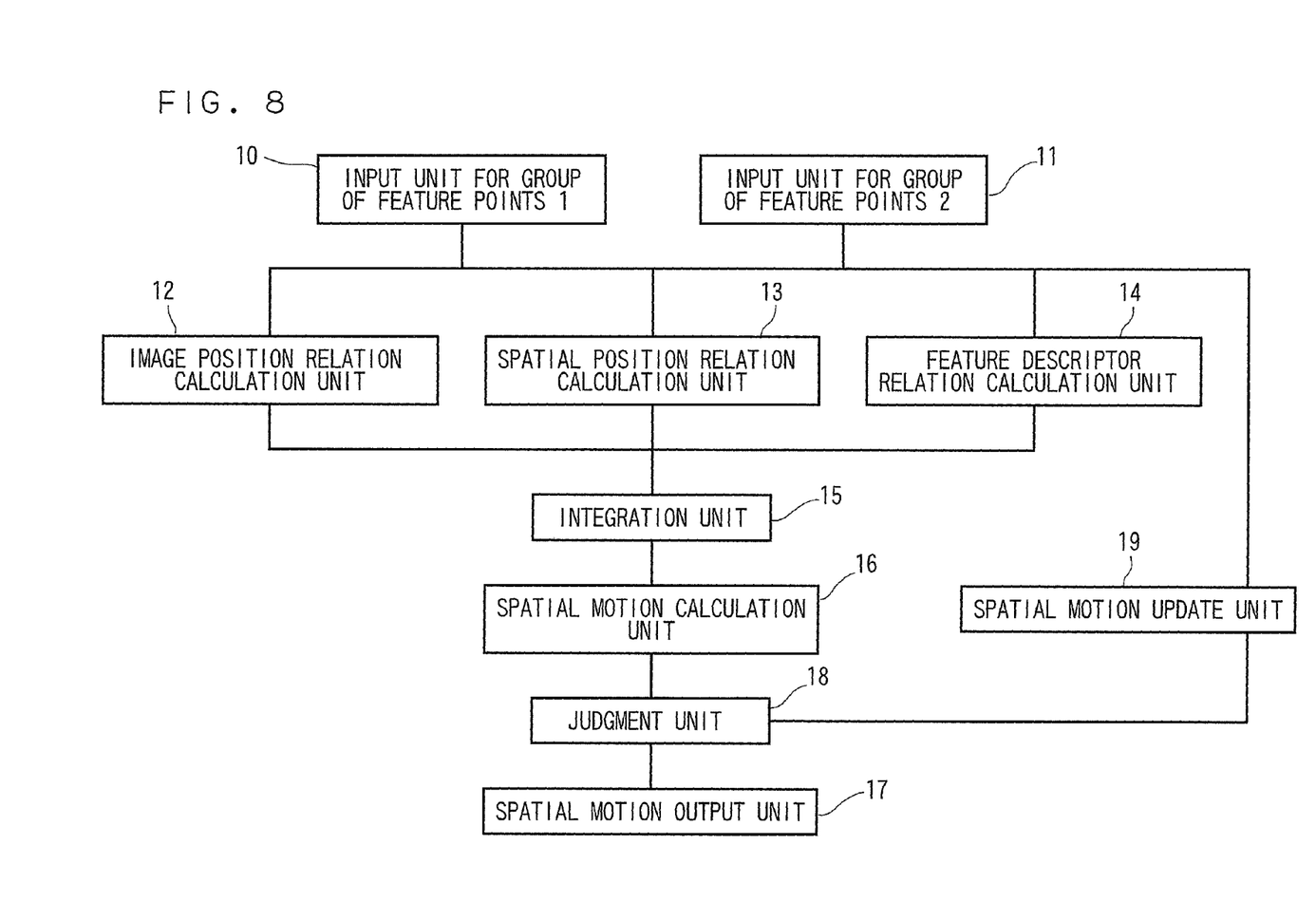
FIG. 8 is a block diagram showing a spatial motion calculation apparatus according to a third embodiment.
Figure 9:
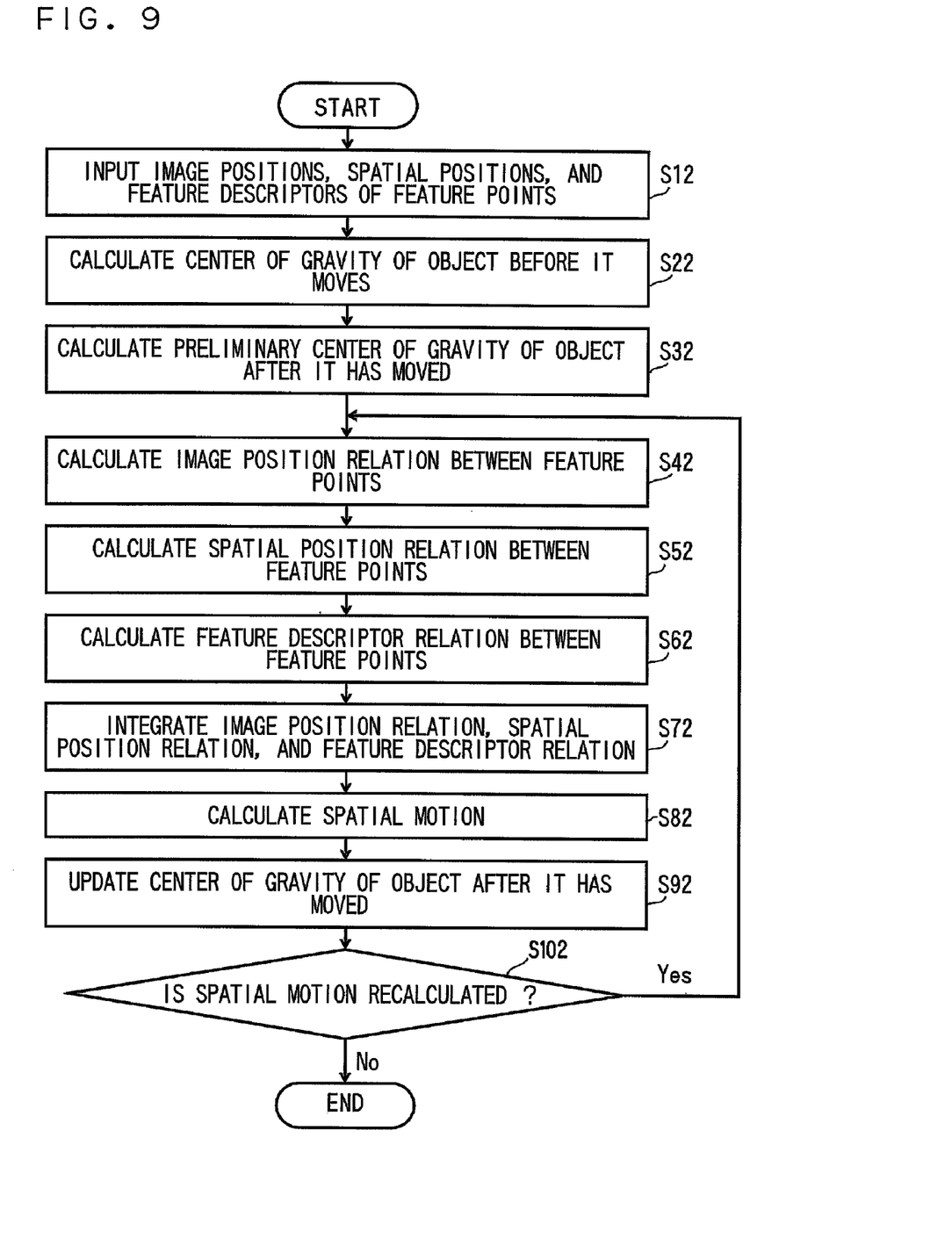
FIG. 9 is a flowchart showing the operation of the spatial motion calculation apparatus according to the third embodiment.

FIG. 8 is a block diagram showing the configuration of the spatial motion calculation apparatus according to the present embodiment, and FIG. 9 is a flowchart for the same.

FIG. 8 is a block diagram showing the configuration of the spatial motion calculation apparatus according to the present embodiment.

The spatial motion calculation apparatus includes an input unit 10 that inputs image positions, spatial positions, and feature descriptors of a group of feature points 1, an input unit 11 that inputs image positions, spatial positions, and feature descriptors of a group of feature points 2, an image position relation calculation unit 12 that calculates a first similarity based on the image position relation between the inputted groups of feature points 1 and 2, a spatial position relation calculation unit 13 that calculates a second similarity based on the spatial position relation between the inputted groups of feature points 1 and 2, a feature descriptor relation calculation unit 14 that calculates a third similarity based on the feature descriptor relation between the inputted groups of feature points 1 and 2, an integration unit 15 that integrates the first to third similarities, a spatial motion calculation unit 16 that estimates the spatial motion based on the result from the integration unit 15, a judgment unit 18 that judges appropriateness of the spatial motion, a spatial motion update unit 19 that updates the center of gravity determined from the spatial motion when the spatial motion is judged to be inappropriate, and an output unit 17 that outputs the spatial motion.

A description will be made of an embodiment in a case where a position in a spatial coordinate system is used as a spatial position, which is the first embodiment.

The steps 12 to 92 are the same as the steps 10 to 90 except that the following additional items are carried out in the steps 12 to 92.

A first additional item includes, in the step 12, preparing a variable C in which the number of repetition of the spatial motion is stored and setting C to zero.

A second additional item includes, in the step 92, adding one to the number of repetition C whenever the spatial motion is calculated.

The judgment unit 18 judges whether or not the calculation results on p=($p_1$, $p_2$) and s calculated in the step 82 are appropriate. For example, the following conditions are conceivable.

A first condition is to see if the number of repetition C updated in the step 92 is greater than or equal to an expected value.

A second condition is to see if the norm of the difference between p=($p_1$, $p_2$) and s calculated in the previous operation (that is, (C-1)-th operation) and p=($p_1$, $p_2$) and s calculated in the current operation (C-th operation) is smaller than an expected value.

A third condition is to see if the value of the equation (70-2) is greater than an expected value.

A fourth condition is to see if the calculated p=($p_1$, $p_2$) and s are within respective expected ranges.

Any one of the above conditions may be employed, or any of the above conditions may be combined.

When the judgment unit 18 judges that the preliminarily determined center of gravity is not accurate, the control returns to the step 42.

The spatial motion can be precisely calculated by recalculating the position of the center of gravity based on the spatial motion determined in the previous calculation, and repeating the steps 42 to 102.

According to the present embodiment, the spatial motion can be calculated in a stable, quick manner by updating the center of gravity even when spatial positional components contain a large amount of noise.

(Variations)

The invention is not limited to the above exact embodiments, but can be embodied by modifying components according to embodiments of the invention to the extent that such modification, when implemented, does not depart from the spirit of the invention. Further, a plurality of components disclosed in the above embodiments can be combined as appropriate to provide a variety of inventive aspects. For example, some of the components may be omitted from all the components shown in each of the above embodiments. Further, components included in different embodiments may be combined as appropriate.

The second embodiment may be employed in the third embodiment involving updating.

While the center of gravity is used in the above embodiments, the center of gravity is not necessarily used. A specific position determined from a group of feature points may be used instead of the center of gravity.

What is claimed is:

1. A spatial motion calculation apparatus comprising:
   a computer associated with a processor, the computer includes:
   a first input unit configured to input image positions in an image coordinate system, spatial positions in a spatial coordinate system, and feature descriptors of a plurality of first feature points within a tracked area of an object of interest before the object moves;
   a second input unit configured to input image positions in the image coordinate system, spatial positions in the spatial coordinate system, and feature descriptors of a plurality of second feature points within an area of containing the object of interest after the object has moved;
   an image position relation calculation unit configured to determine each of first similarity functions based on the image position of each of the plurality of first feature points and the image position of each of the plurality of second feature points, each of the first similarity functions (1) containing a shift on the image coordinate system and a parameter representing a depth direction on the image coordinate system as unknowns and (2) having a larger value when the distance between the image position of each of the plurality of first feature points and the image position of each of the plurality of second feature points is closer;
   a spatial position relation calculation unit configured to determine each of second similarity functions based on the spatial position of each of the plurality of first feature points and the spatial position of each of the plurality of second feature points, each of the second similarity functions (1) containing a shift on the spatial coordinate system and a parameter representing a depth direction on the spatial coordinate system as unknowns and (2) having a larger value when the distance between the spatial position of each of the plurality of first feature points and the spatial position of each of the plurality of second feature points is closer;

a feature descriptor relation calculation unit configured to determine each of third similarity functions based on the feature descriptor of each of the plurality of first feature points and the feature descriptor of each of the plurality of second feature points, each of the third similarity functions having a larger value when the feature descriptor of each of the plurality of first feature points and the feature descriptor of each of the plurality of second feature points are more similar;

an integration unit configured to determine the shift on the image coordinate system and the parameter representing the depth direction on the image coordinate system that maximize an integrated similarity determined by the sum of the products of the first similarity functions, the second similarity functions, and the third similarity functions; and a spatial motion calculation unit configured to calculate the spatial motion of the object of interest between the positions of the object of interest before and after the movement based on the shift on the image coordinate system and the parameter representing the depth direction on the image coordinate system.

2. The apparatus according to claim 1, wherein the integration unit determines an extreme value of the integrated similarity function, determined by the sum of the products of the first similarity functions, the second similarity functions, and the third similarity functions, to determine the shift on the image coordinate system and the parameter representing the depth direction on the image coordinate system that maximize the integrated similarity.

3. The apparatus according to claim 1, wherein the spatial position is a position in a spatial coordinate system of the object of interest.

4. The apparatus according to claim 1, wherein the spatial position is a disparity between a $1^{st}$ reference image and a $2^{nd}$ reference image obtained by imaging the object of interest with stereo cameras.

5. The apparatus according to claim 1, wherein the parameter representing the depth direction is the change in scale of the object of interest before and after the movement on the image coordinate system, or the change in scale of the disparity for the object of interest before and after the movement on the image coordinate system.

6. The apparatus according to claim 1, wherein the integrated similarity function further includes a specific position as an unknown determined from the plurality of second feature points, and the apparatus further comprises an update unit configured to recalculate the specific position based on the shift on the image coordinate system and the parameter representing the depth direction on the image calculated in the integrated unit.

7. The apparatus according to claim 6, wherein the update unit terminates the updating (1) when the updating is carried out at predetermined times, (2) when the difference in the amount of shift on the image coordinate system and the difference in the parameter representing the depth direction on the image coordinate system between before and after the update, are smaller than respective arbitrary values, (3) when the integrated similarity becomes larger than an arbitrary value, or (4) when the shift on the image coordinate system and the parameter representing the depth direction on the image coordinate system after the update are within respective arbitrary ranges.

8. A spatial motion calculation method comprising:

inputting image positions in an image coordinate system, spatial positions in a spatial coordinate system, and feature descriptors of a plurality of first feature points within a tracked area of an object of interest before the object moves;

inputting image positions in the image coordinate system, spatial positions in the spatial coordinate system, and feature descriptors of a plurality of second feature points within an area of containing the object of interest after the object has moved;

determining each of first similarity functions based on the image position of each of the plurality of first feature points and the image position of each of the plurality of second feature points, each of the first similarity functions (1) containing a shift on the image coordinate system and a parameter representing a depth direction on the image coordinate system as unknowns and (2) having a larger value when the distance between the image position of each of the plurality of first feature points and the image position of each of the plurality of second feature points is closer;

determining each of second similarity functions based on the spatial position of each of the plurality of first feature points and the spatial position of each of the plurality of second feature points, each of the second similarity functions (1) containing a shift on the spatial coordinate system and a parameter representing the depth direction on the spatial coordinate system as unknowns and (2) having a larger value when the distance between the spatial position of each of the plurality of first feature points and the spatial position of each of the plurality of second feature points is closer;

determining each of third similarity functions based on the feature descriptor of each of the plurality of first feature points and the feature descriptor of each of the plurality of second feature points, each of the third similarity functions having a larger value when the feature descriptor of each of the plurality of first feature points and the feature descriptor of each of the plurality of second feature points are more similar;

determining the shift on the image coordinate system and the parameter representing the depth direction on the image coordinate system that maximize an integrated similarity determined by the sum of the products of the first similarity functions, the second similarity functions, and the third similarity functions; and utilizing a processor associated with a computer to calculate the spatial motion of the object of interest between the positions of the object of interest before and after the movement based on the shift on the image coordinate system and the parameter representing the depth direction on the image coordinate system.

9. A program non-transitorily stored on a computer-readable medium, the program comprising:

a first input function of inputting image positions in an image coordinate system, spatial positions in a spatial coordinate system, and feature descriptors of a plurality of first feature points within a tracked area of an object of interest before the object moves;

a second input function of inputting image positions in the image coordinate system, spatial positions in the spatial coordinate system, and feature descriptors of a plurality of second feature points within an area of containing the object of interest after the object has moved;

an image position relation calculation function of determining each of first similarity functions based on the image position of each of the plurality of first feature points and the image position of each of the plurality of second feature points, each of the first similarity functions (1) containing a shift on the image coordinate system and a parameter representing a depth direction on the image coordinate system as unknowns and (2) having a larger value when the distance between the image position of each of the plurality of first feature points and the image position of each of the plurality of second feature points is closer;

a spatial position relation calculation function of determining each of second similarity functions based on the spatial position of each of the plurality of first feature points and the spatial position of each of the plurality of second feature points, each of the second similarity functions (1) containing a shift on the spatial coordinate system and a parameter representing a depth direction on the spatial coordinate system as unknowns and (2) having a larger value when the distance between the spatial position of each of the plurality of first feature points and the spatial position of each of the plurality of second feature points is closer;

a feature descriptor relation calculation function of determining each of third similarity functions based on the feature descriptor of each of the plurality of first feature points and the feature descriptor of each of the plurality of second feature points, each of the third similarity functions having a larger value when the feature descriptor of each of the plurality of first feature points and the feature descriptor of each of the plurality of second feature points are more similar;

an integration function of determining the shift on the image coordinate system and the parameter representing the depth direction on the image coordinate system that maximize an integrated similarity determined by the sum of the products of the first similarity functions, the second similarity functions, and the third similarity functions; and a spatial motion calculation function of calculating the spatial motion of the object of interest between the positions of the object of interest before and after the movement based on the shift on the image coordinate system and the parameter representing the depth direction on the image coordinate system.

* * * * *